United States Patent [19]
Nishimura
[11] 3,794,407
[45] Feb. 26, 1974

[54] COLOR PICK-UP DEVICE

[75] Inventor: Shigeru Nishimura, Kyoto, Japan
[73] Assignee: Matsushita Electric Industrial Co., Ltd., Osaka, Japan

[22] Filed: May 1, 1972
[21] Appl. No.: 248,899

Related U.S. Application Data
[63] Continuation-in-part of Ser. No. 883,795, Dec. 10, 1969, abandoned.

[52] U.S. Cl. .......... 350/171, 178/5.4 E, 178/5.4 TC
[51] Int. Cl. .......... G02b 27/10
[58] Field of Search 350/171, 166; 178/5.4 E, 5.4 TC

[56] References Cited
UNITED STATES PATENTS

| | | | |
|---|---|---|---|
| 2,672,072 | 3/1954 | Sachtleben et al. | 350/166 |
| 2,672,502 | 3/1954 | Albright | 350/166 X |
| 2,896,499 | 7/1959 | Lang | 350/166 |
| 3,281,528 | 10/1966 | James | 178/5.4 TC |
| 3,284,566 | 11/1966 | James et al. | 178/5.4 TC |
| 3,288,921 | 11/1966 | James et al. | 178/5.4 TC |
| 3,340,356 | 9/1967 | James | 178/5.4 TC |

*Primary Examiner*—David H. Rubin
*Attorney, Agent, or Firm*—Stevens, Davis, Miller & Mosher

[57] ABSTRACT

A pick-up device adapted to generate a video color signal by the use of a plurality of pick-up tubes, wherein at least two dichroic mirrors are used to defocus an image forming light ray corresponding to the "red" signal and an image forming light ray corresponding to the "blue" signal in the vertical direction only, thereby preventing a decrease of the apparent resolution of a reproduced picture which tends to result from an imperfect registration of the respective color signals.

14 Claims, 15 Drawing Figures

COLOR PICK-UP DEVICE

CROSS-REFERENCE TO RELATED APPLICATION

This application is a continuation-in-part of our co-pending Patent Application Ser. No. 883,795, filed Dec. 10, 1969 now abandoned.

BACKGROUND OF THE INVENTION

1. Field of the Invention

This invention relates to a pick-up device adapted to generate a video color signal by the use of a plurality of pick-up tubes.

2. Description of the Prior Art

As is well known in the art, imperfect registration of the colors represented by video color signals available from a plurality of pick-up tubes results in a decrease of the apparent resolution of the reproduced picture. In order to prevent such decrease in resolution, it is considered that the resolutions of "red" (R) and "blue" (B) signals may be decreased as compared to that of a "green" (G) signal. It is possible to decrease the horizontal resolutions of R and B signals by transmitting these signals in a narrow band. However, no effective means has been devised to decrease the vertical resolutions of such signals.

SUMMARY OF THE INVENTION

Accordingly, it is an object of the present invention to decrease the resolutions of R and B signals by the use of optical means.

Another object of the present invention is to provide means for achieving the aforementioned purpose in accordance with the RGB system.

A further object of the present invention is to provide means for achieving the aforementioned purpose in accordance with the YRGB system (Y represents a luminance signal).

A still further object of the present invention is to provide means for achieving the aforementioned purpose in accordance with the YRB system.

The present invention is characterized by the provision of a color pick-up device comprising a first dichroic mirror or half mirror for reflecting an image forming light ray irradiated thereonto from a lens system in the direction of the Y-axis of three-dimensional Cartesian coordinates of which the X-axis corresponds to the optical axis of said lens system, a second dichroic mirror for reflecting in the direction of the Z-axis the light ray having penetrated through said first mirror, and pick-up tubes receiving the light rays reflected by said first and second mirrors and the light ray having penetrated through said second mirror, wherein at least "red" and "blue" signals each having their vertical resolution decreased are available from said pick-up tubes.

DESCRIPTION OF THE PREFERRED EMBODIMENTS

Figure 1:
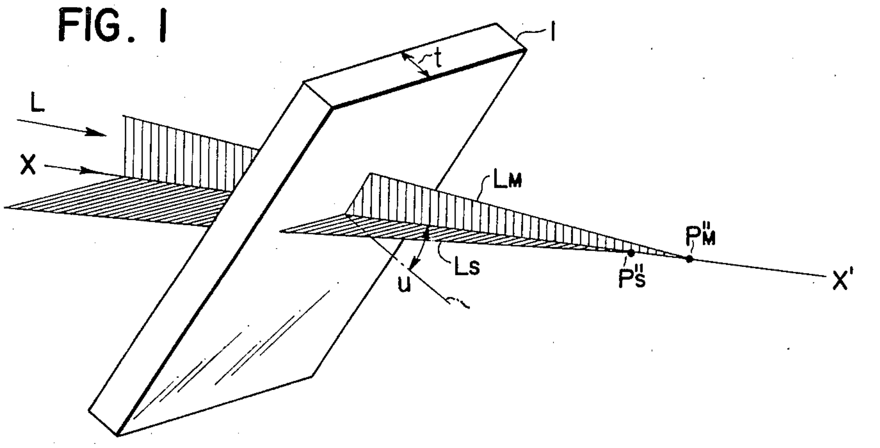
FIG. 1 is an analytical diagram illustrating astigmatism caused by the meridional and the sagittal components of a small bundle of light rays penetrating a planoparallel glass plate.

Description will first be made of a known convergence characteristic of a bundle of light rays when the light rays penetrate a transparent planoparallel glass plate. Referring to FIG. 1, a planoparallel glass plate 1 having a thickness $t$ and a refractive index $n$ is placed inclined at an angle $u$ with the optical axis X–X′. When a bundle of light rays L penetrates the planoparallel glass plate, a meridional component $L_m$ focuses at a point $P_M''$ whereas a sagittal component $L_S$ focuses at a point $P_S''$ due to astigmatism depending on those factors such as the thickness $t$, refractive index $n$ and angle $u$ of the glass plate. Although the effect of astigmatism appears only on the pheripheral portions of a picture plane in a lens system, an astigmatic difference $\Delta$, which is defined as the distance between the focus points $P_M''$ and $P_S''$, appears even on the optical axis where a dichroic mirror composed of planoparallel glass plates is used. Such an astigmatic effect is also observed when a bundle of light rays is reflected by a dichroic mirror having a reflective film on the rear side thereof although not shown in the drawings.

As a suitable glass material for the plano-parallel glass plate, in this invention, a crown glass BK-7 having a refractive index $n$ of about 1.516 is suitably used. Although the refractive index $n$ varies more or less according to the wavelength $\lambda$ of an incident light, not so large errors are observed even where the refractive index is assumed to be constant for color components in a practical design of a color television optical system, since the range of wavelength $\lambda$ is between 400 to 700 nano-meters.

A dichroic mirror employed in the present invention is a planoparallel glass plate having a light interference filter, or a special reflective film coated on either surface thereof, thereby reflecting selectively a portion of the wavelength range (or spectrum) of visible rays and allowing the remaining portions to pass. The special reflective film is formed in a known manner, for example by vacuum depositing a film material having a high refractive index ($n \approx 2.2 \sim 2.4$) such as ZnS, $CeO_2$, TiO or the like, and another film material having a low refractive index ($n \approx 1.3 \sim 1.4$) such as $MgF_2$ or cryolite alternately on the planoparallel glass plate. The thickness of the special reflective film thus formed is, for example, between 1 and 8 microns depending on the design requirements.

Figure 2A:
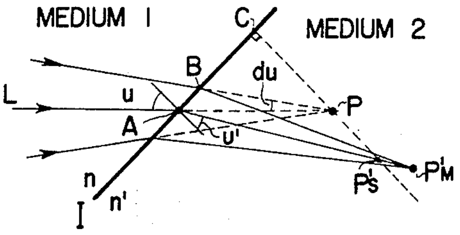
FIG. 2*a* is a geometrical diagram illustrating astigmatism caused by a small bundle of light rays passing from one medium to another.
Figure 2B:
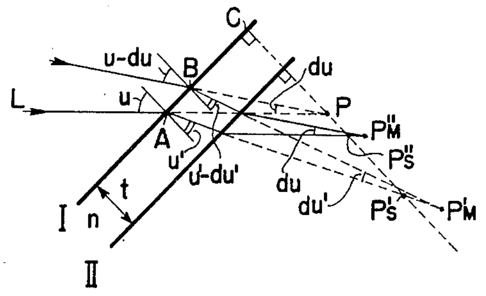
FIG. 2*b* is a geometrical diagram illustrating astigmatism caused by a small bundle of light rays penetrating a planoparallel glass plate.

The astigmatic difference Δ, e.g., the difference between the points $P_S''$ and $P_M''$ shown in FIG. 1 can be determined with the aid of geographic diagrams of FIGS. 2*a* and 2*b*. As shown in FIG. 2*a*, when a small bundle of light rays L impinges on the boundary surface between two mediums, the first having a refractive index n and the second an index $n'$, at an angle $u$ and after refraction enters medium 2 of refractive index $n'$ at an angle $u'$, the meridional component of the small bundle of light rays, which is assumed to be on the plane of this drawing paper, is refracted and focuses at a point $P_M'$ instead of a point P. The point P is a focus where the medium 2 is the same as the medium 1 and there is no refraction. The distance of the point $P_M'$ from the point A is given by the equation below.

$$\overline{AP_M'} = (n' \cos^2 u')/(n \cos^2 u)\ \overline{AP}$$

On the other hand, the sagittal component which is assumed to be contained in the plane perpendicular to the plane of this drawing paper focuses on a point $P_S'$ and the distance of the point $P_S'$ from the point A is given by the equation below.

$$\overline{AP_S'} = (n'/n)\ \overline{AP}$$

Consequently,, two focuses are produced by the meridional and sagittal components respectively.

Furthermore, where a planoparallel glass plate is used, double refraction occurs at both boundaries I and II as illustrated in FIG. 2*b*. The astigmatic difference Δ, e.g., the distance between the points $P_M''$ and $P_S''$ is given by the equation below.

$$\Delta = t(n^2 - 1) \sin^2 u/(n^2 - \sin^2 u)^{3/2}$$

where $t$ is a thickness of the glass plate, n is a refractive index of the glass, and the medium on both sides of the glass plate is supposed to be air. As explained in the foregoing, since two focuses $P_M''$ and $P_S''$ are produced by the meridional and sagittal components respectively, if the target plane of a pick-up tube (or vidicon) is placed on the point $P_S''$, a television signal picture which is defocussed in the vertical direction while having a high resolution in the horizontal direction can be reproduced. Two or three such dichroic mirrors arranged for example as shown in FIGS. 3 and 8 to 11 are used to constitute a beam splitter system for color television cameras in this invention.

More specifically, where two dichroic mirrors are used, the two dichroic mirrors are displaced or twisted 90° about the optical axis with each other and two pick-up tubes to receive respectively the light rays reflected or passed by the two dichroic mirrors are positioned so as to have focuses for the sagittal components respectively. In other words, the two pick-up tubes are defocussed with respect to the meridional components respectively and thus the both light rays from the two dichroic mirrors are optically defocussed in the vertical direction.

Figure 3:
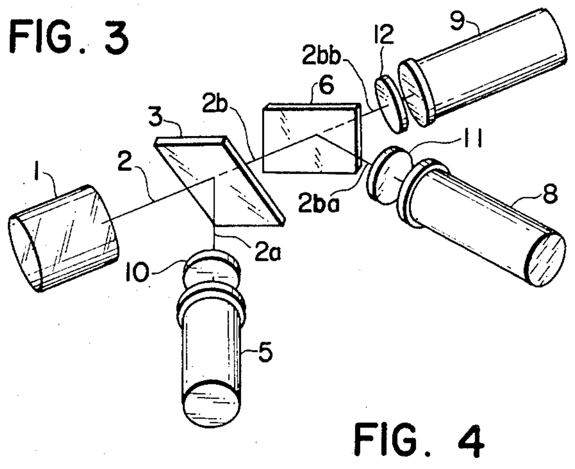
FIG. 3 is a perspective view showing the color pick-up device according the one embodiment of the present invention.
Figure 4:
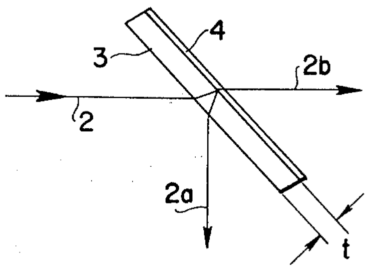
FIG. 4 is a fragmentary sectional view useful for explaining the device shown in FIG. 3.

Referring to FIG. 3, numeral 1 represents the objective lens system of a color television camera, light rays entering through the objective lens system 1 being irradiated onto a first dichroic mirror 3 inclined through about 45° with respect to the optical axis 2 of the objective lens system 1.

The dichroic mirror 3 is provided with a reflective film 4 opposite the light receiving side thereof which is adapted to reflect only red or blue light rays. Thus, light ray 2*a* reflected by the first dichroic mirror and light ray 2*b* permitted to pass therethrough can be made to be out of focus only in the vertical direction to an extent corresponding to the increase in length of their passages resulting from the thickness $t_1$ of the mirror 3. The light rays are out of focus or defocussed in this invention because of astigmatism which results in a low image resolution. Due to astigmatism, two focuses are produced by a meridional component and a sagittal component respectively, and the distance between these two focuses is called the astigmatic difference. Therefore, when a pick-up tube is positioned in such a manner that either of the two focuses falls exactly at the focus of the pick-up tube itself, the other focus remains out of focus, or defocussed, with respect to the pick-up tube. Thus, "defocusing" can be accomplished in either dimension. In order to cancel out the astigmatic difference, two dichroic mirrors placed 90° twisted about the optical axis with each other may be used, since the meridional ray component for one mirror is the sagittal ray component for the other, and vice versa.

By irradiating the light ray 2a reflected by the mirror 3 onto a pick-up tube 5, a "red" or "blue" signal of which the vertical resolution is decreased is available from the tube 5. The light ray 2*b* having penetrated through the mirror 3 is irradiated onto a second dichroic mirror 6 which is disposed in such a manner as to produce a reflection at right angles with respect to a plane containing the aforementioned optical axis 2 and that of the reflected light ray 2*a*.

This dichroic mirror 6 has a reflective film provided on the light receiving side thereof which is adapted to reflect red or blue light rays. Thus, by introducing the light ray 2*ba* reflected by the dichroic mirror 6 onto a pick-up tube 8, it is possible to obtain a "blue" or "red" signal of which the vertical resolution is decreased as is the case with the pick-up tube 5, since the reflected light ray 2*ba* is a direct reflection of the light ray 2*b* having passed through the mirror 3. Light ray 2*bb* having passed through the aforementioned second dichroic mirror horizontally defocussed, due to an increase in the length of the passage thereof corresponding to the length of the thickness of the dichroic mirror 6 as is the case with the first dichroic mirror 3. Thus, if it is assumed that the thickness $t_2$ of the dichroic mirror 6 is equal to the thickness $t_1$ of the dichroic mirror 3, and further if the refractive indices are equal to each other, then it is possible to make the horizontal and vertical variations uniform. In this way, a focussed image can be projected onto a pick-up tube 9, so that a "green" (G) signal with enhanced horizontal and vertical resolutions can be obtained from the tube 9. As will be seen from the foregoing, the "red" and "blue" signals are obtained as ones having the vertical resolutions thereof decreased as compared with that of the "green" signal.

The horizontal resolutions of the resulting R and B signals are decreased by narrowing the band width of the R and B signals down to 500 KHz to 1 MHz. Thus the intended purpose can be achieved. Numerals 10 and 11 indicate "blue" or "red" trimming filters respectively, and 12 a "green" trimming filter.

Figure 5:
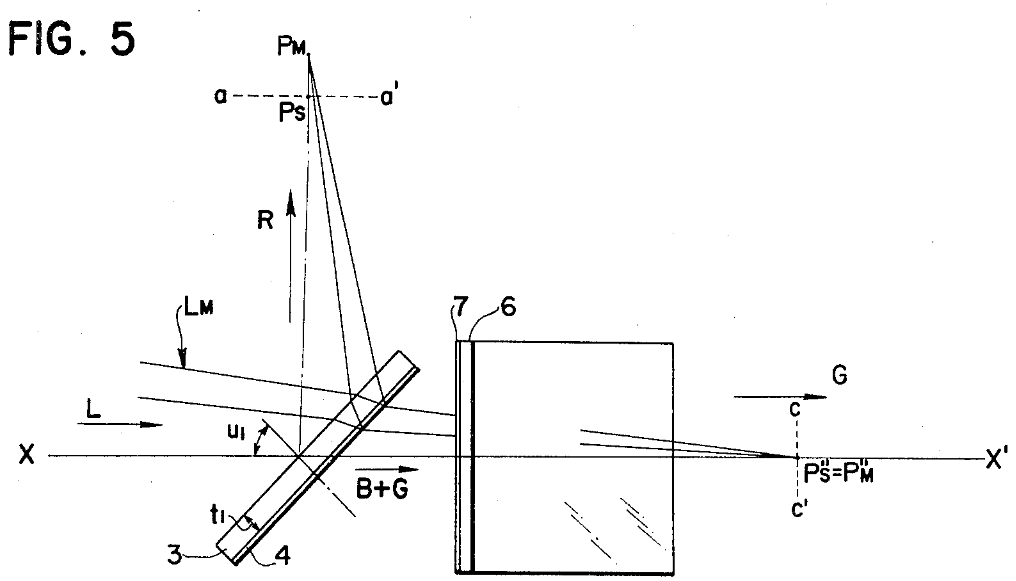
FIGS. 5, 6 and 7 show analytically a dichroic mirror device portion of FIG. 3, in elevation view, in side-view and in perspective view respectively.
Figure 6:
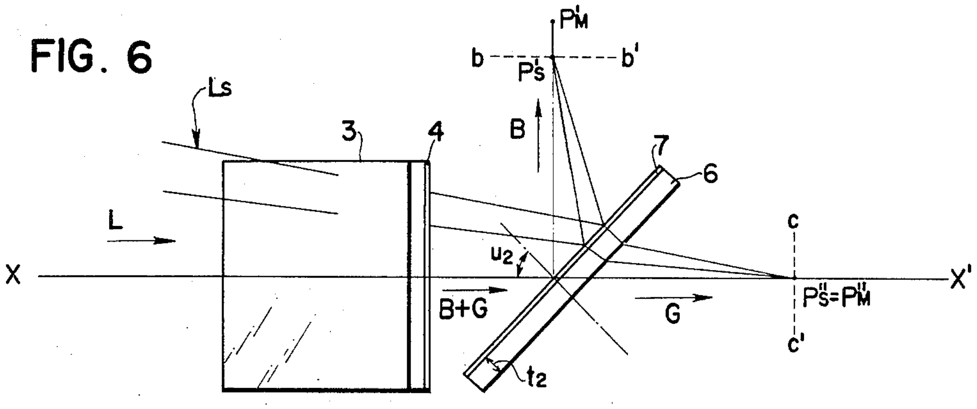
Figure 7:
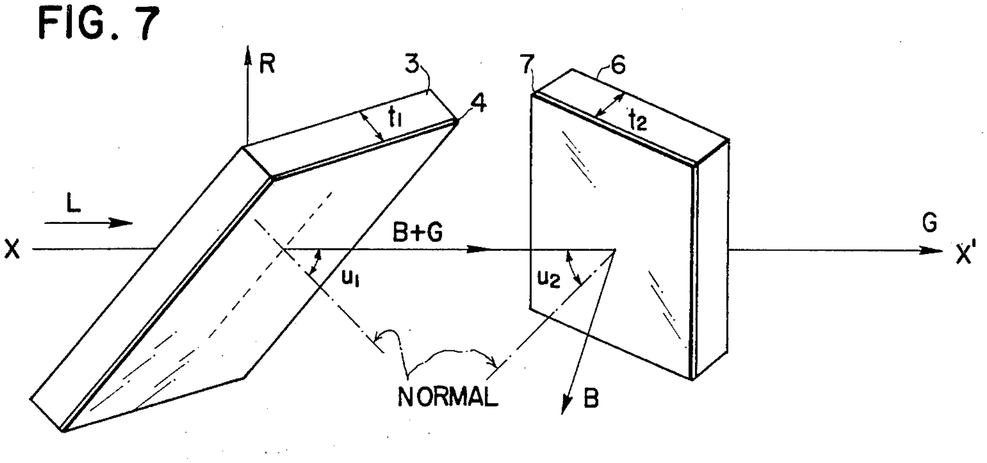

FIGS. 5 to 7 show an enlarged dichroic mirror device portion of FIG. 3, wherein the light convergence effect caused by a set of two dichroic mirrors is illustrated in more detail. In such an arrangement of the first and second dichroic mirrors, the meridional component $L_M$ of a small bundle of light L with respect to the first dichroic mirror 3 corresponds to the sagittal component with respect to the second dichroic mirror 6, since the first and second dichroic mirrors 3 and 6 are displaced 90° about the optical axis X–X' with each other. As a result, for such a light ray G in FIG. 6 which passes the first dichroic mirror 3 and also the second dichroic mirror 6, since the meridional and the sagittal components with respect to the first mirror 3 are respectively converted into the sagittal and the meridional components with respect to the second dichroic mirror 6 and hence the astigmatic differences caused by the first and second dichroic mirrors are in opposite directions to each other, or in other words the relative position of the focuses $P_M''$ and $P_S''$ is reversed, two focuses $P_M''$ and $P_S''$ can be located at the same point as shown in FIGS. 5 and 6 by arranging the absolute values of both astigmatic differences to be equal. Therefore, the condition for the focuses $P_M''$ and $P_S''$ being located on the same point is given by the equation below.

$$t_1(n_1^2-1)\sin^2 u_1/(n_1^2-\sin^2 u_1)^{3/2} \approx t_2(n_2^2-1)\sin^2 u_2/(n_2^2-\sin^2 u_2)^{3/2}$$

where $t_1$ and $t_2$ are thicknesses of the first and the second dichroic mirrors respectively, $n_1$ and $n_2$ are indices of the first and the second dichroic mirrors and $u_1$ and $u_2$ are incident angles to the first and the second dichroic mirrors respectively. In an actual device, where $t_1 = t_2 = 2$ mm, $u_1 = u_2 = 45°$ and $n_1 = n_2 = 1.56$, the focus $P_m''$ falls on the other focus $P_S''$.

Accordingly where the target plane of a pick-up tube is placed at a position represented by a line C–C' shown in FIGS. 5 and 6, a light image with little, if any, astigmatism is converted into an electrical signal (this electrical signal is utilized as a green signal). In FIGS. 5 and 6 where the reflective films 4 and 7 are selectively reflecting for red (R) and blue (B) light rays respectively, by placing the target plane of a pick-up tube for red signal at a position represented by a line *a–a'* passing through the focus $P_S$ of the sagittal component as shown in FIG. 5, the reproduced television picture is out of focus in the vertical direction and the vertical resolution is about 80 TV lines. On the other hand, where the target plane of a pick-up tube for blue signal is placed at a position represented by a line *b–b'* passing through the focus $P_S'$ of the sagittal component of blue light rays reflected by the dichroic mirror 6 shown in FIG. 6, the reproduced television picture can be out of focus in the vertical direction, or a vertical resolution is about 120 TV lines.

Although the device of FIG. 3 has been described with respect to the R-G-B system, the foregoing discussion is true of the Y-R-B system, wherein the thickness of glass 3 is different from that of glass 6, except that the design is such that R and B signals are obtained from the pick-up tubes 8 and 9 and the Y signal from the pick-up tube 5.

Figure 8:
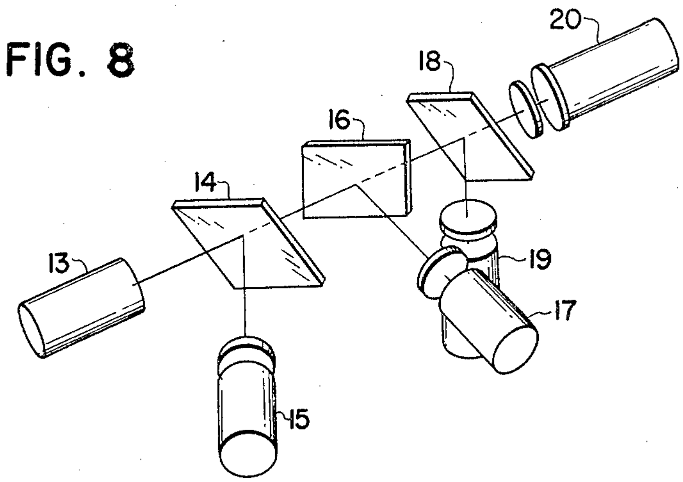
FIG. 8 is a perspective view showing the color pick-up device according to a second embodiment of the present invention.

Description will now be made of the Y-R-G-B system shown in FIG. 8, wherein numeral 13 represents a lens system, and 14 a half mirror having a reflective film provided at the light receiving side thereof and which is disposed in the same positional relationship as the mirror 3 shown in FIG. 3. The half mirror, or a partial transparent mirror per se is known in the art, in which on the side of the incoming light of the two main surfaces of a planoparallel glass plate is coated with a film of metal, such as silver, aluminum or the like, by a vacuum deposition technique. About half the amount of light which impinges the film of metal is reflected and the remainder passes through the film, thereby halving the amount of light received on the half mirror without splitting the light. However, the absorption of light in half mirrors is greater than dichroic mirrors. Since the reflective film of dichroic mirrors is composed of non-metallic materials, the dichroic mirrors exhibit light splitting characteristics and absorbs light less than half mirrors, thereby achieving less deterioration of light penetrating efficiency. Light rays reflected by the half mirror 14 are received by a pick-up tube 15, from which a Y signal is obtained. Numeral 16 denotes a dichroic mirror having a reflective film provided at the light receiving side thereof and which is disposed in the same positional relationship as the mirror shown in FIG. 3. A light ray reflected by the dichroic mirror 16 is received by a pick-up tube 17, from which a B signal of which the resolution is decreased is obtained. Numeral 18 represents a dichroic mirror having a reflective film provided opposite the light receiving side thereof and which is provided in the same positional relationship as the mirror 3 shown in FIG. 3. Light rays reflected by the dichroic mirror 18 and light rays having penetrated therethrough are received by pick-up tubes 19 and 20, from which G and R signals each having a decreased vertical resolution are respectively obtained. In order to have a red light, which has penetrated the half mirror 14 and the dichroic mirrors 16 and 18, affected by astigmatism the equation below must be met:

$$t_1(n_1^2-1)\sin^2 u_1/(n_1^2-\sin^2 u_1)^{3/2} \neq t_2(n_2^2-1)\sin^2 u_2/(n_2^2-\sin^2 u_2)^{3/2} \neq t_3(n_3^2-1)\sin^2 u_3/(n_3^2-\sin^2 u_3)^{3/2}$$

It will be readily apparent that a similar effect can be produced by replacing the first dichroic mirror provided in the embodiments shown in FIG. 3 with a half mirror.

Figure 9:
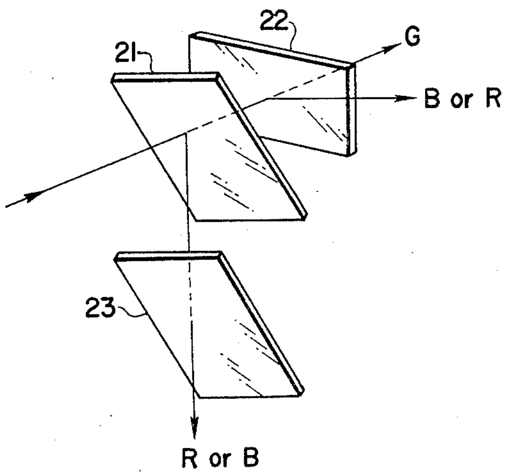
FIGS. 9, 10 and 11 are perspective views showing the mirror portions according to third, fourth and fifth embodiments of the present invention respectively.

Next, description will be made of two examples wherein the present invention is embodied in the RGB system and one example wherein the present invention is embodied in the YRB system. Referring to FIG. 9, there is shown an example of the RGB system wherein dichroic mirrors 21 and 22 are disposed in the same positional relationship as the dichroic mirrors 3 and 6 shown in FIG. 3. These dichroic mirrors 21 and 22 have the same thickness, the dichroic mirror 21 having a reflective film adapted to reflect a "red" or "blue" signal provided on the light receiving surface thereof and the dichroic mirror 22 having a reflective film adapted to reflect "blue" or "red" signal provided on the light receiving surface thereof. Furthermore, an ordinary transparent glass plate 23 is provided in parallel with the dichroic mirror 21. With such an arrangement, the R and B signals are kept under a defocussed condition, whereas the G signal is focussed.

Figure 10:
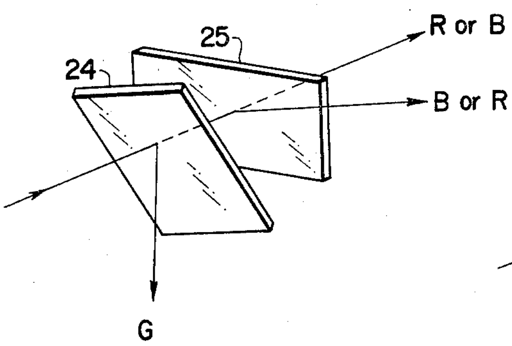

FIG. 10 shows the RGB system as in the case of FIG. 9, wherein dichroic mirrors 24 and 25 are disposed in the same manner as in FIG. 9, the dichroic mirror 24 having a reflective film adapted to reflect a G signal provided on the light receiving surface thereof and the dichroic mirror 25 having a reflective film adapted to reflect a B or an R signal provided on the light receiving surface thereof. In this case, it is required that the mirrors 24 and 25 be made different in thickness from each other. With such an arrangement, an effect similar to that obtained with the arrangement of FIG. 9 can be produced.

Figure 11:
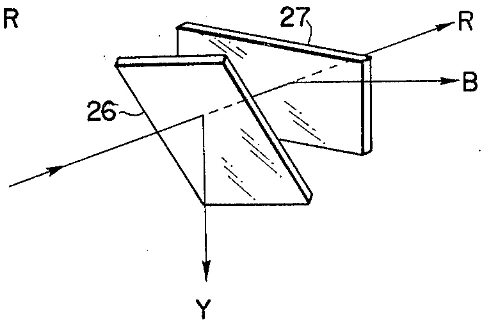

FIG. 11 shows the YRB system wherein mirrors 26 and 27 are disposed in substantially the same manner as in FIG. 10, the front mirror 26 being constituted by a half mirror. With such an arrangement, only R and B signals will be defocussed. In this case, too, the thickness of the half mirror 26 is differentiated from that of the dichroic mirror 27, as in FIG. 10. In this embodiment, it is also possible to replace the dichroic mirrors with half mirrors.

Figure 12:
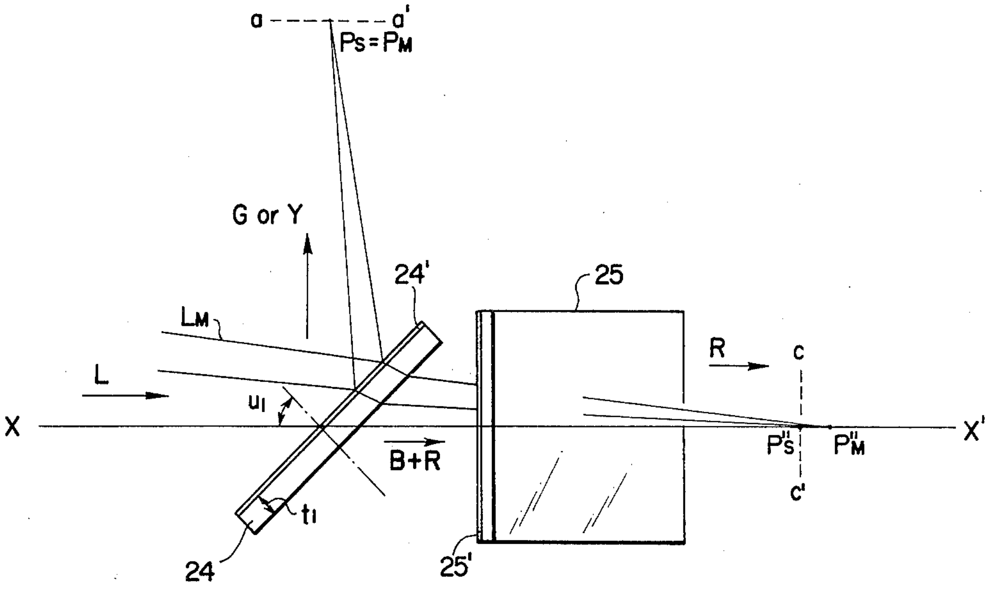
FIGS. 12, 13 and 14 show analytically the embodiments of FIGS. 10 and 11, in elevation view, in side-view and in perspective view respectively.
Figure 13:
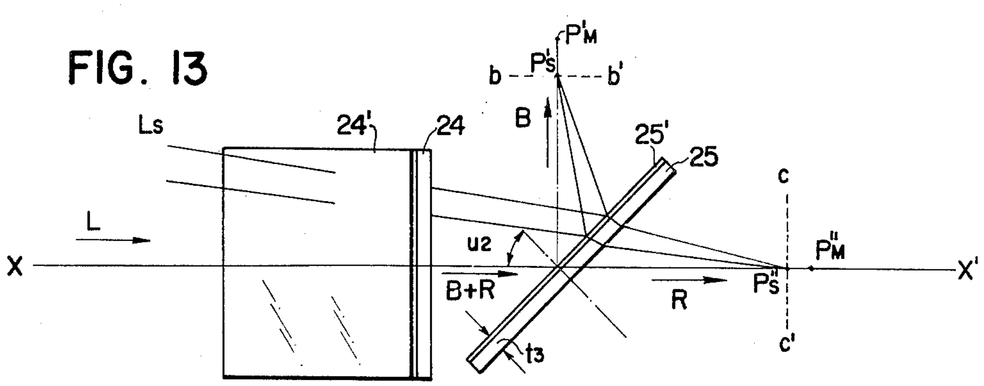
Figure 14:
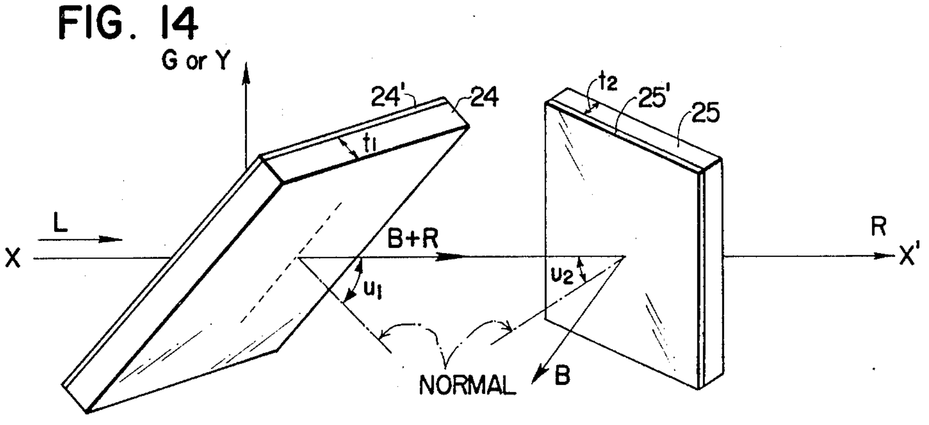

FIGS. 12 to 14 illustrate analytically the embodiments shown in FIGS. 10 and 11 in more detail. In FIG. 12, the first dichroic mirror 24 is provided with a reflective film of a thickness $t_1$ on the side of the incoming light for reflecting a green signal (G) (or provided with a light interference filter having a relative luminous efficiency characteristics) and is inclined at an angle $u_1$ (for example, $u_1 = 45°$) with respect to the optical axis X–X'. The second dichroic mirror 25 is provided with a blue light reflective film of a thickness $t_2$ on the side of the incoming light and is inclined at an angle $u_2$ (for example, $u_2 = 45°$) with respect to the optical axis X–X'. However, the first and the second dichroic mirrors are displaced 90° about the optical axis with each other.

Since a bundle of light rays incoming to the first mirror 24 are reflected at the front surface thereof, focuses of the meridional and sagittal components $P_M$ and $P_S$ are on the same point. As a result where the target plane of a pick-up tube is placed at such a position as shown by a line *a–a'* passing on the focuses $P_M$ and $P_S$ in FIG. 12, a light image on the target plane which is not affected by astigmatism is converted into an electrical signal. The blue light which has passed the first dichroic mirror 24 is reflected at the front surface of the second dichroic mirror 25 and produces the focuses $P_M'$ and $P_S'$ by the meridional and the sagittal components respectively. Therefore, where the target plane of a pick-up tube is placed at such a position as shown by a line *b–b'* passing on the focus $P_S'$ of the sagittal component, a television picture is obtained which is out of focus in the vertical direction. The red light (R) which passes also the second dichroic mirror having a thickness $t_2$ produces focuses $P_M''$ and $P_S''$ by the meridional and the sagittal components respectively, and accordingly where the target plane of a pick-up tube is placed at such a position as shown by a line *c–c'* passing on the focus $P_S''$ in FIG. 13, a reproduced television picture which is out of focus in the vertical direction is obtained. In the case explained above, where the thickness $t_1$ is 2 mm whereas $t_2$ is about 1 mm, the degree of defocussing achieved is about 100 TV lines for a blue signal image and about 150 TV lines for a red signal image. In this embodiment, in contrast to that shown in FIGS. 9 to 11, the focuses $P_M''$ and $P_S''$ of the meridional and the sagittal components of the light (R) which has passed the first and the second dichroic mirrors do not fall on the same point, because the astigmatic difference $\Delta_1$ caused by penetrating the first mirror is not cancelled out by the astigmatic difference $\Delta_2$ caused by penetrating the second mirror. It is to be noted that in FIGS. 12 and 13 (also in FIGS. 5 and 6) the focuses $P_M''$ and $P_S''$ are not exactly aligned on the axis X–X' but displaced with each other as illustrated in FIGS. 2a and 2b. However, since the displacement is so negligible both focuses $P_M''$ and $P_S''$ are shown on the axis *x–x'* aligned.

Referring again to FIGS. 12 to 14, where the first dichroic mirror 24 is to reflect a Y signal as is the case in FIG. 11, only the first dichroic mirror 24 is required to be replaced by a half mirror.

I claim:

1. A color pick-up device comprising:

an objective lens located in the path of image-forming light rays transmitted from an object, a first dichroic mirror located in the path of image-forming rays transmitted through said objective lens for reflecting a first portion of the image-forming rays transmitted through said objective lens, said first mirror having a thickness $t_1$, and provided with a reflective film on the surface opposite to the ray receiving surface thereof, said first dichroic mirror having a refractive index $n_1$, and making an angle $u_1$ with the optical axis of the device, a second dichroic mirror located in the path of image-forming rays transmitted through said dichroic mirror for reflecting a second portion of the image-forming rays transmitted through said first mirror, said second dichroic mirror having a thickness $t_2$, and provided with a reflective film on the ray receiving surface thereof, said second dichroic mirror having a refractive index $n_2$, and making an angle $u_2$ with the optical axis, the angles $u_1$ and $u_2$ being displaced 90° about the optical axis from each other, a first pick-up tube for receiving said first portion of the image-forming rays reflected by said first dichroic mirror, said first pick-up tube having its target plane located at the focus of a sagittal component of the reflected first ray portion, thereby obtaining a vertically decreased resolution of said first reflected ray portion, a second pick-up tube for receiving said second portion of the image-forming rays reflected by said second dichroic mirror, said first pick-up tube having its target plane located at the focus of a sagittal component of the reflected second ray portion, thereby obtaining a vertically decreased resolution of said second reflected ray portion, and a third pick-up tube located in the path of the image-forming rays transmitted through said first and second dichroic mirrors, the thicknesses and the refractive indices of said mirrors together with the angles made by said mirrors with the optical axis being so chosen that:

$$t_1\ (n_1^2 - 1) \sin^2 u_1/(n_1^2 - \sin^2 u_1)^{3/2} \neq t_2\ (n_2^2 - 1) \sin^2 u_2/(n_2^2 - \sin^2 u_2)^{3/2}$$

thereby obtaining a third image-forming ray portion having a resolution decreased neither vertically or horizontally.

2. A color pick-up device according to claim 1, wherein said first ray portion lies in the red frequency spectrum, said second ray portion lies in the blue frequency spectrum, and said third ray portion lies in the green frequency spectrum.

3. A color pick-up device according to claim 1, wherein said first ray portion lies in the blue frequency spectrum, said second ray portion lies in the red frequency spectrum, and said third ray portion lies in the green frequency spectrum.

4. A color pick-up device comprising:

an objective lens located in the path of image-forming light rays transmitted from an object, a first dichroic mirror located in the path of image-forming rays transmitted through said objective lens for reflecting a first portion of the image-forming rays transmitted through said objective lens, said first mirror having a thickness $t_1$, and provided with a reflective film on the light ray receiving surface thereof, said first dichroic mirror having a refractive index $n_1$, and making an angle $u_1$ with the optical axis of the device, a second dichroic mirror for receiving located in the path of image-forming rays transmitted through said first dichroic mirror and for reflecting a second portion of the image-forming rays transmitted through said first mirror, said second dichroic mirror having a thickness $t_2$, and provided with a reflective film on the light ray receiving surface thereof, said second dichroic mirror having a refractive index $n_2$, and making an angle $u_2$ with the optical axis, the angles $u_1$ and $u_2$ being displaced 90° about the optical axis from each other, a first pick-up tube for receiving said first portion of the image-forming rays reflected by said first dichroic mirror, said fist pick-up tube receiving said first image-forming rays free of astigmatism, a second pick-up tube for receiving said second portion of the image-forming rays reflected by said second dichroic mirror, said second pick-up tube having its target plane located at the focus of a sagittal component of the reflected second ray portion, thereby obtaining a vertically decreased resolution of said second reflected ray portion, and a third pick-up tube located in the path of a third image-forming ray portion transmitted through said first and second dichroic mirrors, said third pick-up tube having its target plane located at the focus of a sagittal component of the third image-forming ray portion, thereby obtaining vertically decreased resolution of said third image-forming ray portion, the thicknesses and the refractive indices of said mirrors together with the angles made by said mirrors with the optical axis being so chosen that:

$$t_1 (n_1^2 - 1) \sin^2 u_1/(n_1^2 - \sin^2 u_1)^{3/2} \neq t_2(n_2^2 - 1) \sin^2 u_2/(n_2^2 - \sin^2 u_2)^{3/2}.$$

5. A color pick-up device according to claim 4, wherein said first ray portion lies in the green frequency spectrum, said second ray portion lies in the blue frequency spectrum, and said third ray portion lies in the red frequency spectrum.

6. A color pick-up device according to claim 4, wherein said first ray portion lies in the green frequency spectrum, said second ray portion lies in the red frequency spectrum, and said third ray portion lies in the blue frequency spectrum.

7. A color pick-up device according to claim 4, wherein the reflective film on the surface of said first dichroic mirror comprises a light interference filter having relative luminous efficiency characteristics, and wherein said second ray portion lies in the blue frequency spectrum, and said third ray portion lies in the red frequency spectrum.

8. A color pick-up device according to claim 4, wherein the reflective film on the surface of said first dichroic mirror comprises a light interference filter having relative luminous efficiency characteristics, and wherein said second ray portion lies in the red frequency spectrum, and said third ray portion lies in the red frequency spectrum.

9. A color pick-up device comprising:

an objective lens located in the path of image-forming rays transmitted from an object, a first dichroic mirror located in the path of image-forming rays transmitted through said objective lens for reflecting a first portion of the image-forming rays transmitted through said objective lens, said first mirror having a thickness $t_1$, and provided with a reflective film on the light ray receiving surface thereof, said first dichroic mirror having a refractive index $n_1$, and making an angle $u_1$, with the optical axis of the device, a second dichroic mirror located in the path of image-forming rays transmitted through said first dichroic mirror for reflecting a second portion of the image-forming rays transmitted through said first mirror, said second dichroic mirror having a thickness $t_2$, and provided with a reflective film on the light ray receiving surface thereof, said second dichroic mirror having a refractive index $n_2$, making an angle $u_2$ with the optical axis, the angles $u_1$ and $u_2$ being displaced 90° about the optical axis from each other, a planoparallel glass plate located in the path of said first image-forming ray portion reflected by said first dichroic mirror, a first pick-up tube for receiving the first image-forming ray portion reflected by said first dichroic mirror and transmitted through said glass plate, said first pick-up tube having its target plane located at the focus of a sagittal component of the first reflected image-forming ray portion, thereby obtaining a vertically decreased resolution of said first reflected ray portion, a second pick-up tube for receiving the second image-forming ray portion reflected by said second dichroic mirror, said second pick-up tube having its target plane located at the focus of a sagittal component of the second reflected image-forming ray portion, thereby obtaining a vertically decreased resolution of said second reflected ray portion, and a third pick-up tube located in the path of the image-forming rays transmitted through said first and second dichroic mirrors, the thicknesses and the refractive indices of said first and second dichroic mirrors together with the angles made by said mirrors with the optical axis being so chosen that:

$$t_1 (n_1^2 - 1) \sin^2 u_1/(n_1^2 - \sin^2 u_1)^{3/2} \approx t_2 (n_2^2 - 1) \sin^2 u_2/(n_2^2 - \sin^2 u_2)^{3/2}$$

thereby obtaining a third image-forming ray portion having a resolution decreased neither vertically or horizontally.

10. A color pick-up device according to claim 9, wherein said first ray portion lies in the red frequency spectrum, said second ray portion lies in the blue frequency spectrum, and said third ray portion lies in the green frequency spectrum.

11. A color pick-up device according to claim 9, wherein said first portion lies in the blue frequency spectrum, said second ray portion lies in the red frequency spectrum, and said third ray portion lies in the green frequency spectrum.

12. A color pick-up device wherein the input signal is a YRGB signal, comprising:

an objective lens located in the path of image-forming rays transmitted from an object, a first dichroic mirror located in the path of image-forming rays transmitted through said objective lens for reflecting a first portion of the image-forming rays transmitted through said objective lens, said first mirror having a thickness $t_1$, and provided with a reflective film on the light ray receiving surface thereof, said first dichroic mirror having a refractive index $n_1$, and making an angle $u_1$ with the optical axis of the device, a second dichroic mirror located in the path of image-forming rays transmitted through said first dichroic mirror for reflecting a second portion of the image-forming rays transmitted through said first mirror, said second dichroic mirror having a thickness $t_2$, and provided with a reflective film on the surface opposite to the light ray receiving surface thereof, said second dichroic mirror having a refractive index $n_2$, and making an angle $u_2$ with the optical axis, a half mirror located between said lens and said first mirror in the path of said image-forming rays and having a thickness $t_3$ and a refractive index $n_3$, and making an angle $u_3$ with the optical axis, the angles $u_2$ and $u_3$ being displaced 90° about the optical axis relative to the angle $u_1$, a first pick-up tube for receiving said first portion of the image-forming rays reflected by said first dichroic mirror, said first pick-up tube having its target plane located at the focus of a sagittal component of the first reflected image-forming ray portion, thereby obtaining a vertically decreased resolution of said first reflected ray portion, a second pick-up tube for receiving said second portion of the image-forming rays reflected by said second dichroic mirror, said second pick-up tube having its target plane located at the focus of a sagittal component of the second reflected image-forming ray portion, thereby obtaining a vertically decreased resolution of said second image-forming ray portion, a third pick-up tube located in the path of a third portion of the image-forming rays transmitted through said half mirror and said first and second dichroic mirrors, said third pick-up tube having its target plane located at the focus of a sagittal component of the third image-forming ray portion, thereby obtaining a vertically decreased resolution of said third reflected ray portion, and a fourth pick-up tube for receiving a fourth image-forming ray portion reflected by said half mirror, said fourth pick-up tube obtaining a Y signal free of astigmatism, the thicknesses and the refractive indices of said first and second dichroic mirrors and said half mirror together with the angles made by said mirrors with the optical axis being so chosen that:

$$t_1 (n_1^2 - 1) \sin^2 u_1/(n_1^2 - \sin^2 u_1)^{3/2} \neq t_2(n_2^2 - 1) \sin^2 u_2/(n_2^2 - \sin^2 u_2)^{3/2} \neq t_3 (n_3^2 - 1) \sin^2 u_3/(n_3^2 - \sin^2 u_3)^{3/2}.$$

13. A color pick-up device according to claim 12, wherein said first ray portion lies in the red frequency spectrum, said second ray portion lies in the blue frequency spectrum and said third ray portion lies in the green frequency spectrum.

14. A color pick-up device comprising:

an objective lens located in the path of image-forming rays transmitted from an object, a half mirror located in the path of image-forming rays transmitted through said objective lens for reflecting a first portion of the image-forming rays transmitted through said objective lens, said half mirror having a thickness $t_1$, and provided with a reflective film on the ray receiving surface thereof, said half mirror having a refractive index $n_1$, and making an angle $u_1$ with the optical axis of the device, a dichroic mirror located in the path of image-forming rays transmitted through said half mirror for reflecting a second portion of the image-forming rays transmitted through the half mirror, said dichroic mirror having a thickness $t_2$, and provided with a reflective film on the ray receiving surface thereof, said dichroic mirror having a refractive index $n_2$, and making an angle $u_2$ with the optical axis, the angles $u_1$ and $u_2$ being displaced 90° about the optical axis from each other, a first pick-up tube for receiving said first portion of the image-forming rays reflected by said half mirror, said first pick-up tube located to receive said first image-forming rays free of astigmatism, a second pick-up tube for receiving said second portion of the image-forming rays reflected by said dichroic mirror, said second pick-up tube having its target plane located at the focus of a sagittal component of the second reflected ray portion, thereby obtaining vertically decreased resolution of said second image-forming rays, and a third pick-up tube located in the path of a third image-forming ray portion transmitted through said half and dichroic mirrors, said third pick-up tube having its target plane located at the focus of a sagittal component of the penetrating image-forming rays, thereby obtaining a vertically decreased resolution of a third image-forming ray, the thicknesses and the refractive indices of said mirrors together with the angles made by said mirrors with the optical axis being so chosen that:

$$t_1 (n_1^2 - 1) \sin^2 u_1/(n_1^2 - \sin^2 u_1)^{3/2} \neq t_2 (n_2^2 - 1) \sin^2 u_2/(n_2^2 - \sin^2 u_2)^{3/2}.$$

* * * * *

UNITED STATES PATENT OFFICE
CERTIFICATE OF CORRECTION

PATENT NO. : 3,794,407

DATED : February 26, 1974

INVENTOR(S) : Shigeru NISHIMURA

It is certified that error appears in the above-identified patent and that said Letters Patent are hereby corrected as shown below:

Claim 8, line 7, delete "red" and insert therefor --blue--.

The following priority information should appear on the above-identified patent:

JAPAN Patent Appln. No. 92849/68, filed December 13, 1968.

Signed and sealed this 10th day of June 1975.

(SEAL)
Attest:

RUTH C. MASON
Attesting Officer

C. MARSHALL DANN
Commissioner of Patents
and Trademarks